(12) United States Patent
Fioravanti et al.

(10) Patent No.: US 8,128,113 B2
(45) Date of Patent: Mar. 6, 2012

(54) FRAME FOR CYCLES, IN PARTICULAR FOR MOUNTAIN BIKES

(75) Inventors: Matteo Fioravanti, Moncalieri (IT); Diego Squillace, Turin (IT)

(73) Assignee: Fioravanti S.R.L., Turin (IT)

( * ) Notice: Subject to any disclaimer, the term of this patent is extended or adjusted under 35 U.S.C. 154(b) by 510 days.

(21) Appl. No.: 12/161,277

(22) PCT Filed: Jan. 16, 2007

(86) PCT No.: PCT/IB2007/050131
§ 371 (c)(1),
(2), (4) Date: Jul. 17, 2008

(87) PCT Pub. No.: WO2007/083261

PCT Pub. Date: Jul. 26, 2007

(65) Prior Publication Data

US 2010/0219608 A1 Sep. 2, 2010

(30) Foreign Application Priority Data

Jan. 18, 2006 (IT) .............................. TO2006A0032

(51) Int. Cl.
*B62K 3/02* (2006.01)

(52) U.S. Cl. ..................... 280/281.1; 280/274; 280/278; 280/287

(58) Field of Classification Search ............... 280/281.1, 280/274, 278, 287, 288.2
See application file for complete search history.

(56) References Cited

U.S. PATENT DOCUMENTS

| | | | | |
|---|---|---|---|---|
| 86,235 A * | 1/1869 | Laubach | .......................... | 280/263 |
| 425,017 A * | 4/1890 | Barrow | ...................... | 280/281.1 |
| 428,737 A | 5/1890 | Withers, Jr. | | |
| 694,567 A * | 3/1902 | Moore | ......................... | 280/281.1 |
| 1,551,094 A * | 8/1925 | Francis | ......................... | 280/281.1 |
| 2,773,695 A * | 12/1956 | Holloway | ..................... | 280/7.11 |
| 3,448,997 A * | 6/1969 | Kosugi | ......................... | 280/281.1 |
| 3,533,643 A * | 10/1970 | Yamada | ..................... | 280/281.1 |
| 4,296,940 A * | 10/1981 | Herbert | ......................... | 280/278 |
| 4,400,003 A * | 8/1983 | de la Haye | ..................... | 280/278 |
| 4,613,146 A * | 9/1986 | Sharp et al. | ................. | 280/288.2 |
| 5,403,028 A * | 4/1995 | Trimble | ......................... | 280/284 |
| 6,032,971 A * | 3/2000 | Herder | ......................... | 280/278 |
| 6,220,614 B1 * | 4/2001 | O'Neil | ......................... | 280/220 |
| 6,270,103 B1 | 8/2001 | Grimm | | |
| 6,712,371 B2 * | 3/2004 | Trubiano | ..................... | 280/274 |

* cited by examiner

*Primary Examiner* — Joanne Silbermann
*Assistant Examiner* — Maurice Williams
(74) *Attorney, Agent, or Firm* — Sughrue Mion, PLLC

(57) ABSTRACT

The frame (10) comprises a seat tube (11) to the top end (11*a*) of which a saddle (12) is to be connected, and a front structure (14) and a rear structure (15) which are identical and have, in side view, a generally V-shaped configuration with the ends (14*a*, 14*b*; 15*a*, 15*b*) connected to the seat tube (11) and the respective vertices (14*c*, 15*c*) facing in opposite directions relative to the seat tube (11).

9 Claims, 7 Drawing Sheets

FRAME FOR CYCLES, IN PARTICULAR FOR MOUNTAIN BIKES

The present invention relates to frames for cycles.

The term "cycles" in this description and in the appended claims is not intended to be limited solely to bicycles but extends in general to cycles of different types such as, for example, bicycles with assisted propulsion, motor cycles, etc.

Specifically, the subject of the present invention is a frame for cycles in particular for so-called "mountain bikes", comprising in known manner:

a seat tube to the top end of which a saddle is to be connected, and a front structure and a rear structure which have, in side view, a generally V-shaped configuration with the ends connected to the seat tube and the respective vertices facing in opposite directions relative to the seat tube.

In the solutions which are used predominantly at the moment, a frame for cycles is produced in the form of a network structure comprising a predetermined number, possibly even quite a large number of tubular elements which are connected to one another, usually by welding. The production processes are quite complex and expensive owing to the large number of parts to be interconnected and to the number of operations required.

An object of the present invention is therefore to provide a frame for cycles of the type specified above which has a simplified structure suitable for permitting a corresponding simplification of the production processes which are thus rendered more economical.

This object is achieved according to the invention by a frame for cycles the basic characteristics of which are defined in appended claim 1.

A further object of the invention is to propose a frame for cycles which enables the same frame elements to be used to produce both frames in a "men's" version, that is, with a tube or similar element which extends approximately horizontally between the region of attachment of the front wheel fork and the region in which the seat tube supports the saddle, and frames in a "ladies'" version in which the frame forms a supporting member extending upwards between the said two regions.

Figure 1:
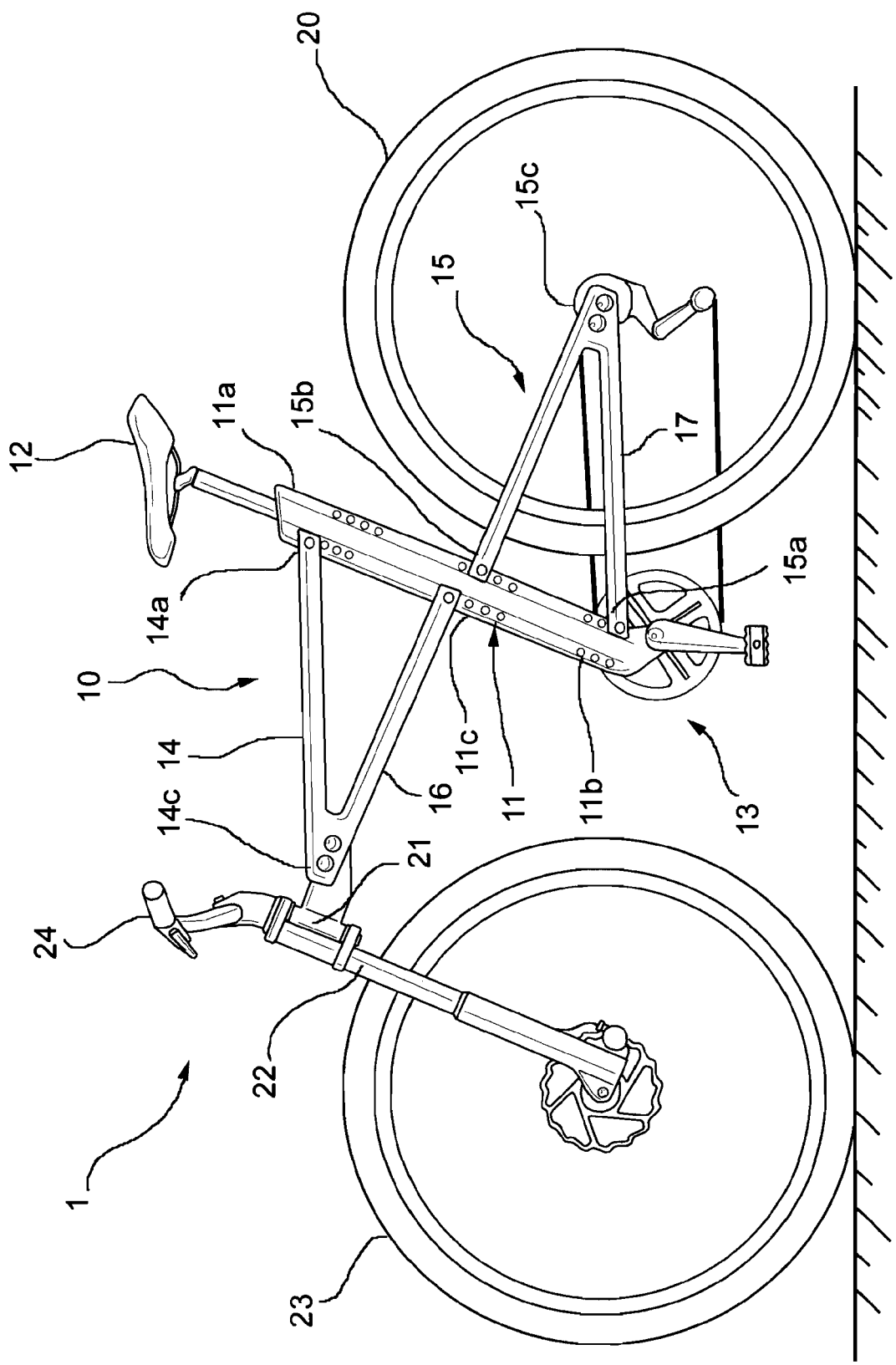
Figure 2:
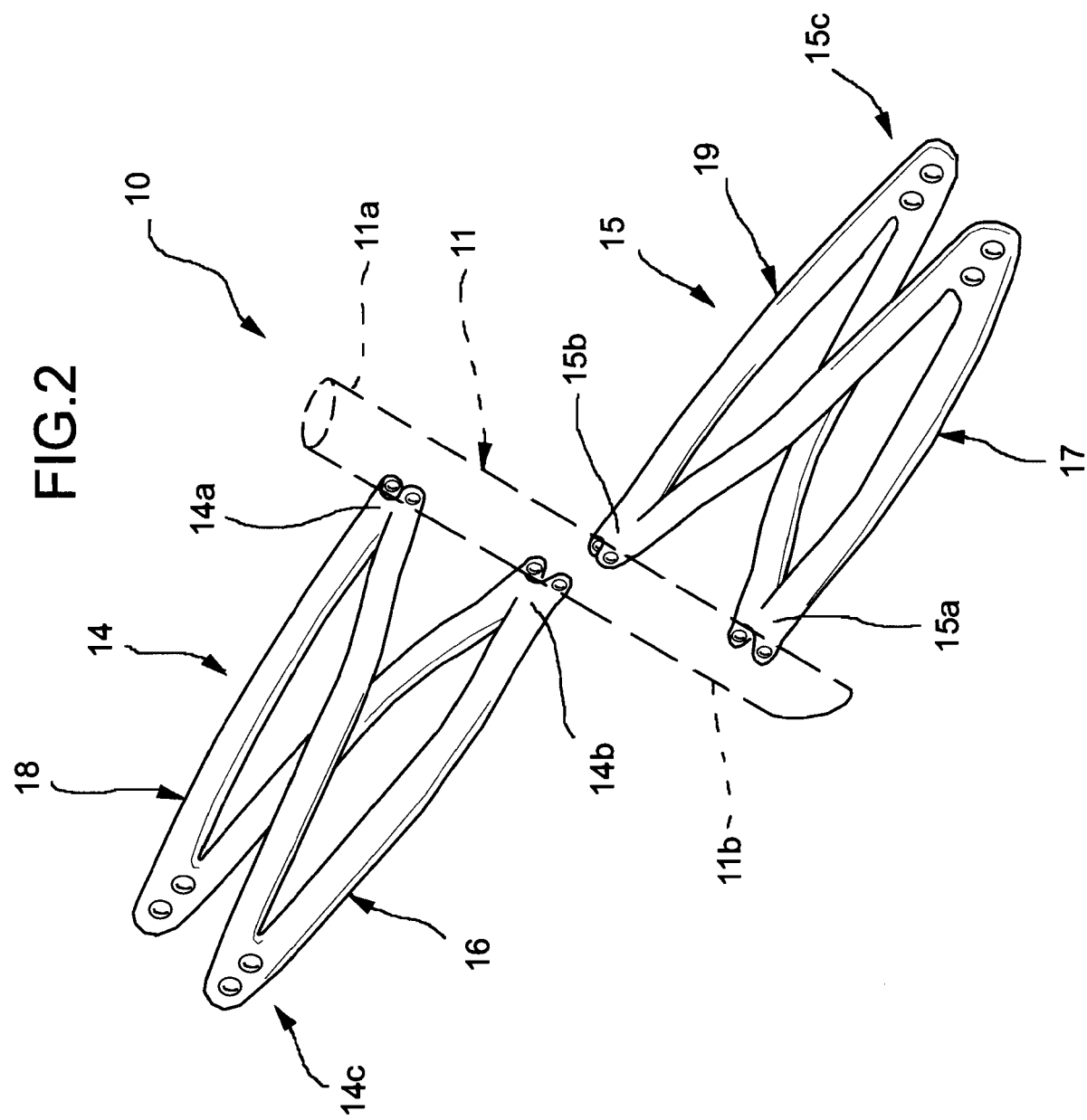
Figure 3:
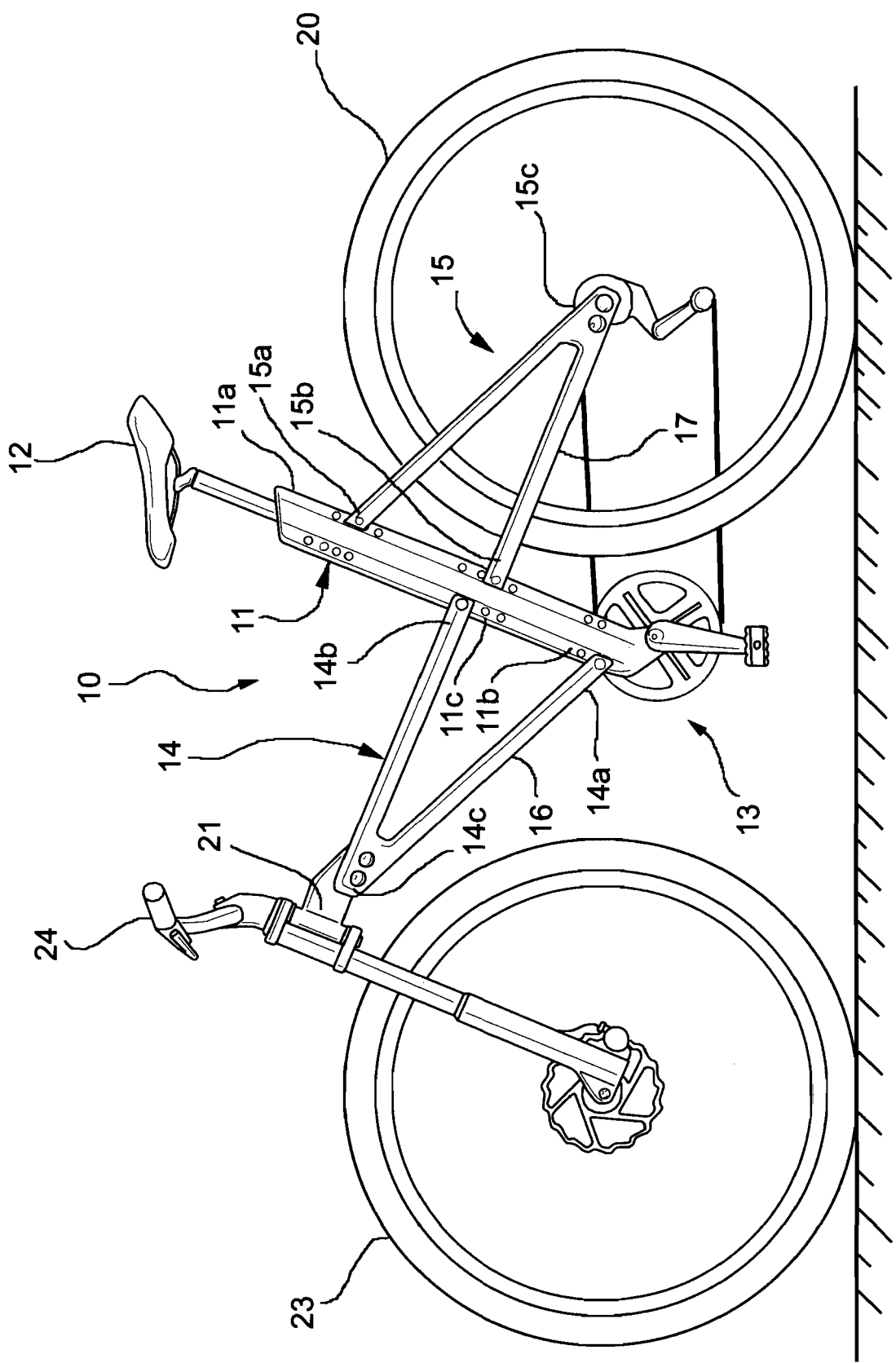
Figure 4:
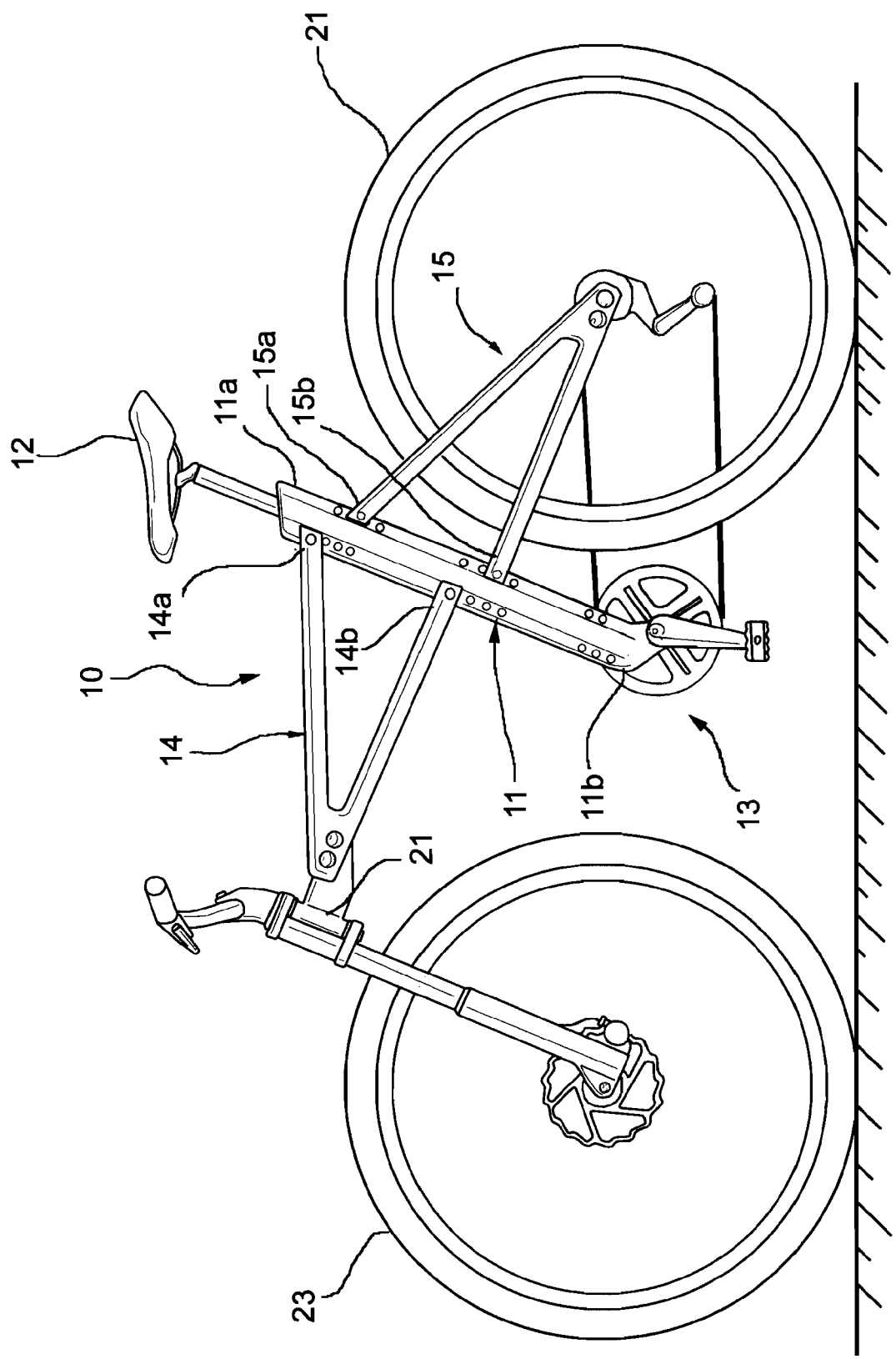
Figure 5:
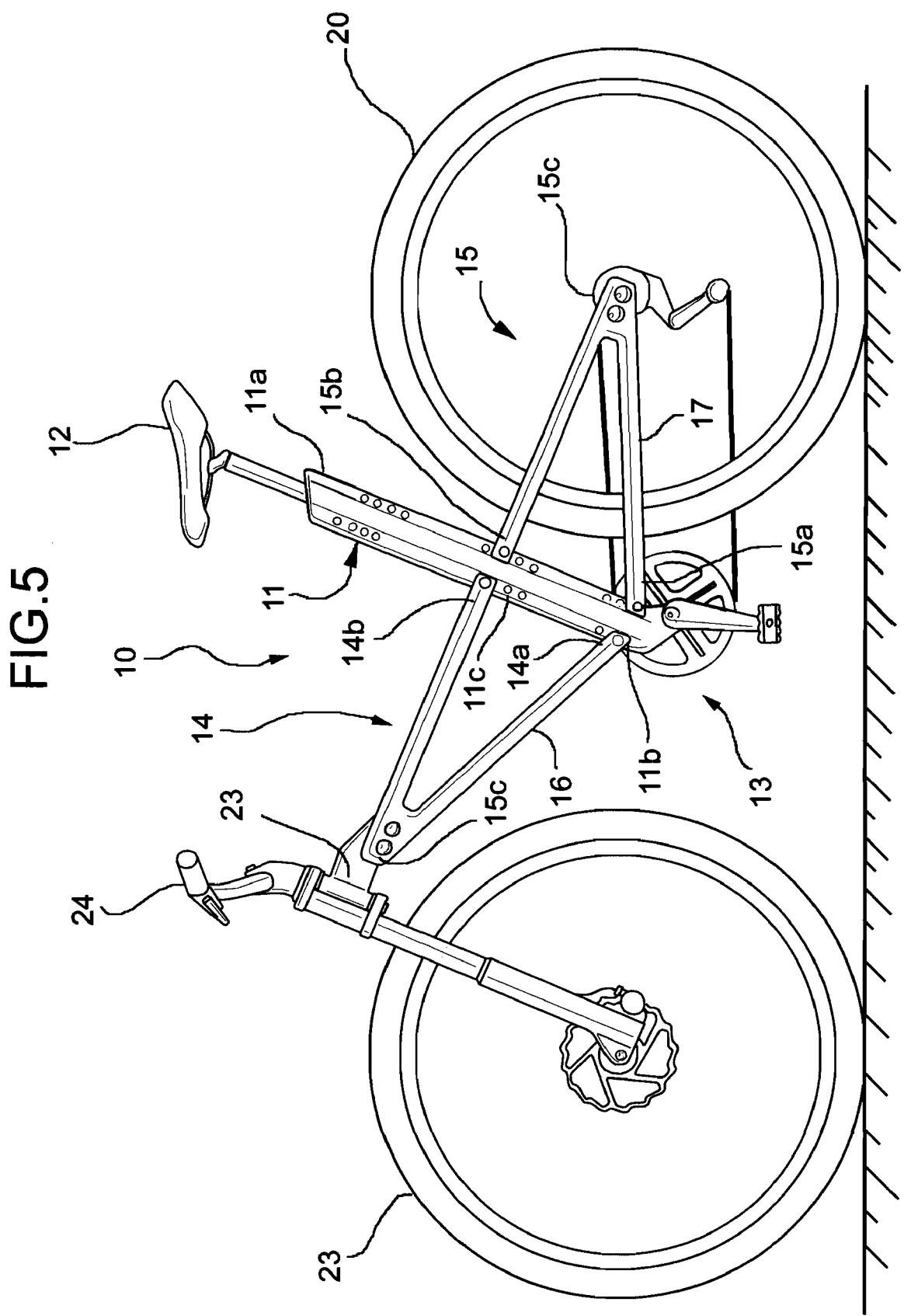
Figure 6:
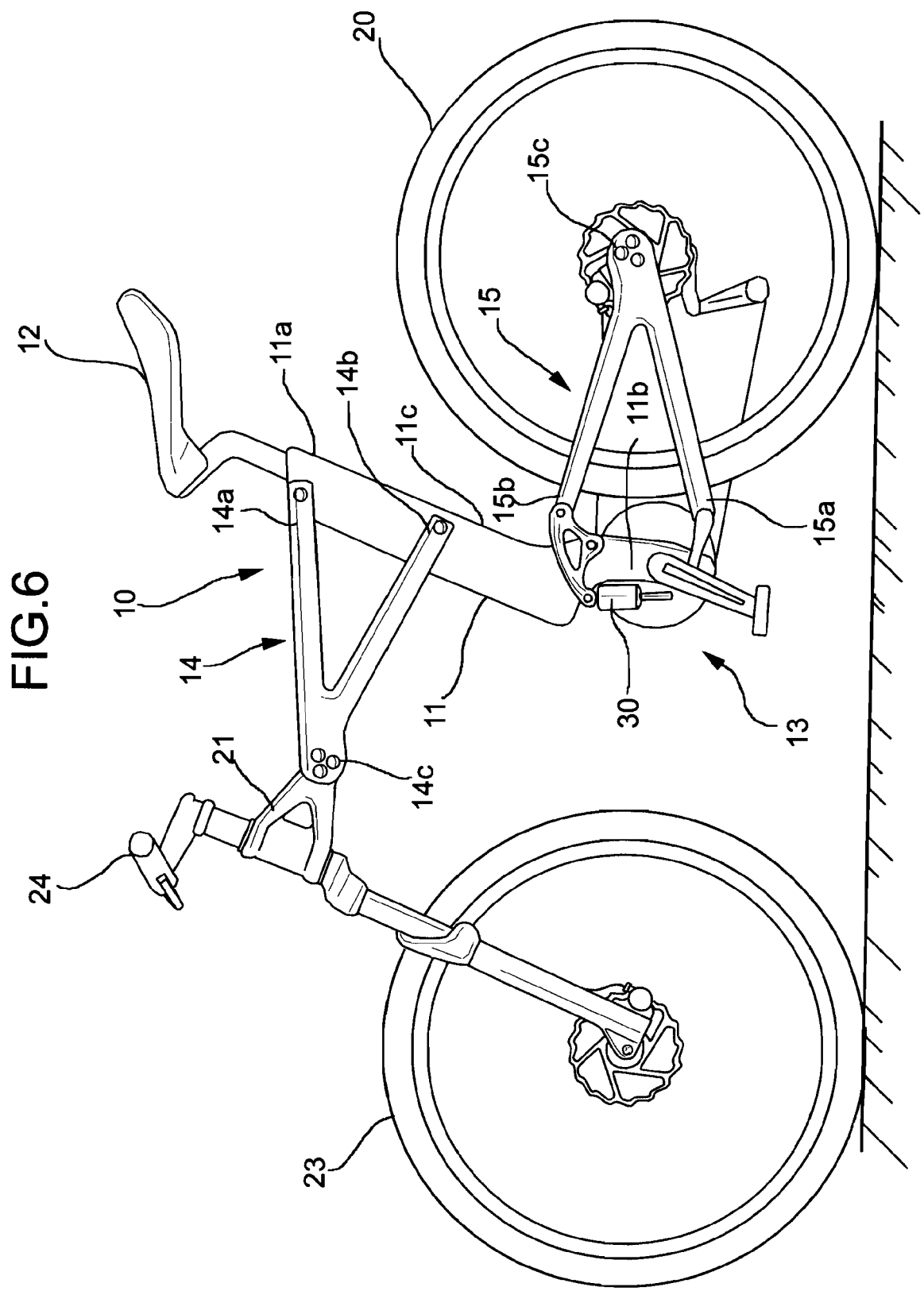
Figure 7:
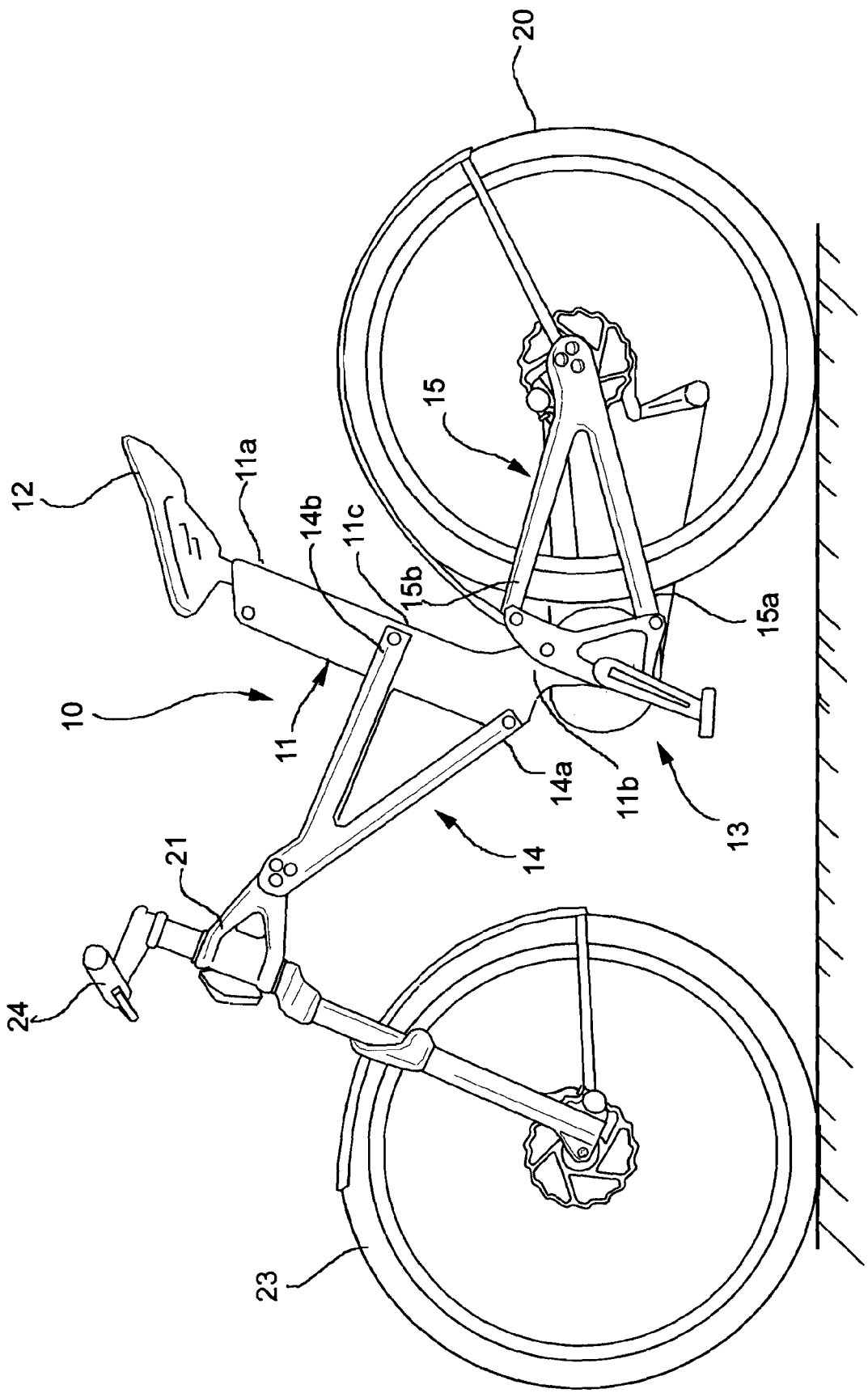

Further characteristics and advantages of the invention will become clear from the following detailed description which is given purely by way of non-limiting example with reference to the appended drawings, in which:

FIG. 1 is a side elevational view of a "men's" bicycle comprising a frame produced in accordance with the present invention, FIG. 2 is a partial perspective view of the frame of the bicycle shown in FIG. 1, FIG. 3 is a side elevational view of a "ladies'" bicycle in which the frame comprises the same parts as the frame shown in the previous drawings, assembled in a different configuration, FIGS. 4 and 5 are side elevational views of a further two bicycles, that is a "men's" bicycle and a "ladies'" bicycle, respectively, the frames of which comprise the same parts as the frames according to the previous drawings simply assembled in further different configurations, FIG. 6 is a side elevational view of a further "men's" bicycle comprising a frame according to the invention, and FIG. 7 is a side elevational view of a "ladies'" bicycle comprising a frame produced by connecting the components of the frame of FIG. 6 in a different configuration.

In FIG. 1, a bicycle, in particular of the so-called "mountain bike" type, is generally indicated 1 and comprises a frame 10 according to the present invention.

The frame 10 comprises a seat tube 11 operatively arranged vertically or almost vertically (that is, having an inclination to the vertical which may reach angles of the order of 30°).

The seat tube 11 has an upper end 11a which carries a saddle 12. A pedal unit 13 of known type is connected to the lower end 11b of the seat tube 11.

The frame 10 further comprises a front structure and a rear structure which are indicated 14 and 15. These structures have, in side view, a generally V-shaped configuration with their respective ends 14a, 14b and 15a, 15b connected to the seat tube 11 and their respective vertices 14c and 15c facing in opposite directions relative to the seat tube 11.

As can be seen from the drawings, in the frame 10 according to the invention, the structures 14 and 15 are identical and interchangeable.

With reference to FIG. 1, in side view, the vertices 14c and 15c and the ends 14a, 14b and 15a, 15b of the front and rear structures 14 and 15 define respective triangles. In the embodiment shown by way of example, the triangles are scalene, in particular, substantially right-angled. Alternatively, however, the triangles could be isosceles.

With reference in particular to FIG. 2, in the embodiment shown by way of example, each of the front and rear structures 14 and 15 comprises two V-shaped elements 16, 18 and 17, 19, respectively, which are identical to one another and have their ends connected to the seat tube 11 and their respective vertices spaced apart transversely. In the embodiment shown, the V-shaped elements of each structure 14, 15 have their respective homologous ends interconnected beforehand in particular by welding. However, this interconnection is not mandatory since the V-shaped elements may be connected directly to the seat tube 11 individually, by any known fixing means or method.

In the embodiment shown (FIG. 2), there is sufficient space between the homologous arms or limbs of the V-shaped elements 17, 19 of the rear structure 15 to house the rear wheel of the cycle, indicated 20 in FIG. 1.

The corresponding space between the homologous arms of the V-shaped elements 16 and 18 of the front structure 14 may be used to fit one or more accessories on the frame 10, such as bags, navigation devices, etc.

A steering tube 21 (FIG. 1) for the rotary support of the fork 22 (preferably with shock-absorbers) associated with the front wheel 23 and of the corresponding handlebar 24 can be fixed between the vertices of the V-shaped elements 16, 18 of the front structure 14.

Although reference is made in the drawings and in the foregoing description to a front structure and a rear structure each comprising a pair of V-shaped elements, a cycle frame in which these structures are identical and interchangeable but each comprises a single V-shaped element falls within the scope of the invention. In this case, the rear wheel 20 is cantilevered beside the vertex of the V-shaped element of the rear structure.

In the embodiments shown by way of example in the drawings, the vertices 14c, 15c and the ends 14a, 14b and 15a, 15b of the front structure 14 and of the rear structure 15 define, in side view, respective scalene triangles, in particular right-angled triangles with two sides or catheti of unequal length.

In the frame shown in FIG. 1, the front structure 14 has the end 14a connected to the upper end portion 11a of the seat tube 11 and the second end 14b connected to a central or intermediate portion 11c of the seat tube. Moreover, in side view, the "hypotenuse" of the triangle corresponding to the front structure 14 extends almost horizontally between the upper end 11a of the seat tube 11 and the steering tube 21.

The rear structure 15 in the frame of FIG. 1, on the other hand, has the end 15a connected to the lower end portion 11b of the seat tube 11 and the other end 15b connected to the central or intermediate portion 11c of the seat tube.

In the configuration shown in FIG. 1, the frame 10 thus has a configuration particularly suitable for a "men's" bicycle.

However, the frame 10 can be reconfigured extremely easily so as to be as shown in FIG. 3. In the frame 10 shown in this drawing, the front structure 14 has the end 14b connected to the central or intermediate portion 11c of the seat tube 11 but its other end 14a is now connected to the lower end portion 11b of the seat tube 11 in the vicinity of the pedal unit 13. In other words, in the frame 10 according to FIG. 3, the front structure 14 is the same as the frame of FIG. 1 but has been fitted in an arrangement in which it has been rotated through 180° about the axis which extends through its vertex 14c and its end 14b.

In the frame of FIG. 3 the rear structure 15 has also been mounted in an arrangement in which it has been rotated through 180° from the arrangement of FIG. 1; the end 15a of the structure 15 is now connected to the upper end 11a of the seat tube 11 in the vicinity of the saddle whereas the other end 15b is now connected to the intermediate portion 11c of the seat tube.

The configuration of the frame 10 according to FIG. 3 can be used in particular in a "ladies'" bicycle.

FIG. 4 shows a frame 10 produced with the same parts as the frame according to FIGS. 1 and 3 which are interconnected in a new and different way.

In the frame according to FIG. 4, the front structure 14 is connected to the seat tube 11 as in FIG. 1 but the rear structure 15 is connected to the seat tube 11 in the manner shown in FIG. 3.

A further different frame suitable for use for the construction of a "men's" bicycle is thus produced.

A frame 10 with yet another different configuration is shown in FIG. 5 in which the front structure 14 is connected to the seat tube 11 as in the frame of FIG. 3 but the rear structure 15 is connected to the seat tube 11 as shown in FIG. 1.

The frame of FIG. 5 is particularly suitable for the production of a "ladies'" bicycle.

In all of the frames of FIGS. 1 to 5, the front structure is identical to the rear structure 15. This permits a reduction in the number of components and a simplification of assembly operations.

FIGS. 6 and 7 show two further configurations of the frame 10 according to the present invention with a front structure 14 and a rear structure 15 which are identical and are connected to the seat tube 11 in two different configurations corresponding substantially to those of FIG. 1 and FIG. 5.

Moreover, FIGS. 6 and 7 show how the rear structure 15 can be connected to the seat tube 11 in an articulated manner and by means of a shock-absorber device (indicated 30 in FIG. 6) so that the rear structure 15 can pivot in a damped manner about a horizontal transverse axis, relative to the seat tube.

FIG. 7 also shows, by way of non-limiting example, how the space between the two prongs of the front structure 14 can advantageously be used to house accessories such as containers etc.

Naturally, the principle of the invention remaining the same, the forms of embodiment and details of construction may be varied widely with respect to those described and illustrated purely by way of non-limiting example, without thereby departing from the scope of the invention as defined in the appended claims.

The invention claimed is:

1. A frame (10) for cycles (1), comprising:
   a seat tube (11) to the top end (11a) of which a saddle (12) is to be connected, and
   a front structure (14) and a rear structure (15) which have, in side view, a generally V-shaped configuration with the ends (14a, 14b; 15a, 15b) connected to the seat tube (11) and the respective vertices (14c, 5c) facing in opposite directions relative to the seat tube (11),
   wherein the front structure (14) and the rear structure (15) are substantially identical to one another and interchangeable and have respective first ends (14a, 15a) connected to an end portion (11a or 11b) of the seat tube (11) and respective second ends (14b, 15b) connected to a central or intermediate portion (11c) of the seat tube (11), whereby the frame (10) is adapted to assume selectively one of a plurality of different configurations by rotating one or both of said structures (14, 15) and connecting the first end (14a, 15a) of the or each rotated structure (14, 15) to the other end portion (11b or 11a) of the seat tube.

2. A frame for cycles according to claim 1 in which, in side view, the vertices (14c, 15c) and the ends (14a, 14b; 15a, 15b) of the front structure (14) and of the rear structure (15) define respective isosceles triangles.

3. A frame for cycles according to claim 1 in which, in side view, the vertices (14c, 15c) and the ends (14a, 14b; 15a, 15b) of the front structure (14) and of the rear structure (15) define respective scalene triangles, right-angled triangles.

4. A frame for cycles according to claim 1 in which each of the front structure (14) and the rear structure (15) comprises two identical V-shaped elements (16, 18; 17, 19) having their ends connected to the seat tube (11) and their respective vertices spaced apart transversely.

5. A frame for cycles according to claim 4 in which the V-shaped elements (16, 18; 17, 19) of the same structure (14, 15) have their homologous ends interconnected, by welding.

6. A frame for cycles according to claim 1 in which the front structure (14) has an end (14a) connected to the upper end portion (11a) of the seat tube (11).

7. A frame for cycles according to claim 1 in which the front structure (14) has an end (14a) connected to the lower end portion of the seat tube (11).

8. A frame for cycles according to claim 1 in which the rear structure (15) has an end (15a) connected to the upper end portion (11a) of the seat tube (11).

9. A frame for cycles according to claim 1 in which the rear structure (15) has an end (15a) connected to the lower end portion (11b) of the seat tube (11).

* * * * *